United States Patent [19]

Berry

[11] 4,401,018
[45] Aug. 30, 1983

[54] COOKING APPARATUS

[76] Inventor: Uylsses Berry, 154 W. 103rd St., Chicago, Ill. 60628

[21] Appl. No.: 263,365

[22] Filed: May 14, 1981

[51] Int. Cl.³ .............................................. A47J 37/04
[52] U.S. Cl. ...................................... 99/420; 99/341; 99/427; 99/443 C; 99/446; 99/448; 198/477; 198/687
[58] Field of Search ............... 126/41 A, 273; 99/341, 99/446, 448, 443 C, 427, 419, 420, 477, 478, 479; 198/477, 687

[56] References Cited

U.S. PATENT DOCUMENTS

| | | | |
|---|---|---|---|
| 1,518,811 | 12/1924 | Murray | 99/443 C |
| 1,534,867 | 4/1925 | Peschke et al. | 99/477 |
| 1,903,488 | 4/1933 | Stibbs | 99/443 R |
| 1,952,968 | 3/1934 | Brand | 99/479 |
| 2,517,360 | 8/1950 | Singer | 99/446 X |
| 2,928,524 | 3/1960 | Jensen | 99/443 C |
| 3,288,054 | 11/1966 | Weprin et al. | 99/478 |
| 3,563,160 | 2/1971 | Otsuka | 99/420 |
| 3,664,257 | 5/1972 | Meyer | 99/427 |

Primary Examiner—Billy J. Wilhite
Attorney, Agent, or Firm—Edward D. Gilhooly

[57] ABSTRACT

A cooking apparatus for roasting, broiling or smoking meat or other food by hanging the item over a source of heat in a manner that the meat and the like is constantly moved to accomplish rapid and flavorful cooking. The food is carried by a series of removable hangers attached to a rack which is subjected to motion by use of an electric motor and the like. The drippings from the food being cooked drips downward for efficient collection as needed during operation of the barbecue cooking apparatus. The barbecue cooking apparatus is insulated to prevent the escape of heat to the surroundings and is capable of superior cooking of food with juices substantially intact.

11 Claims, 5 Drawing Figures

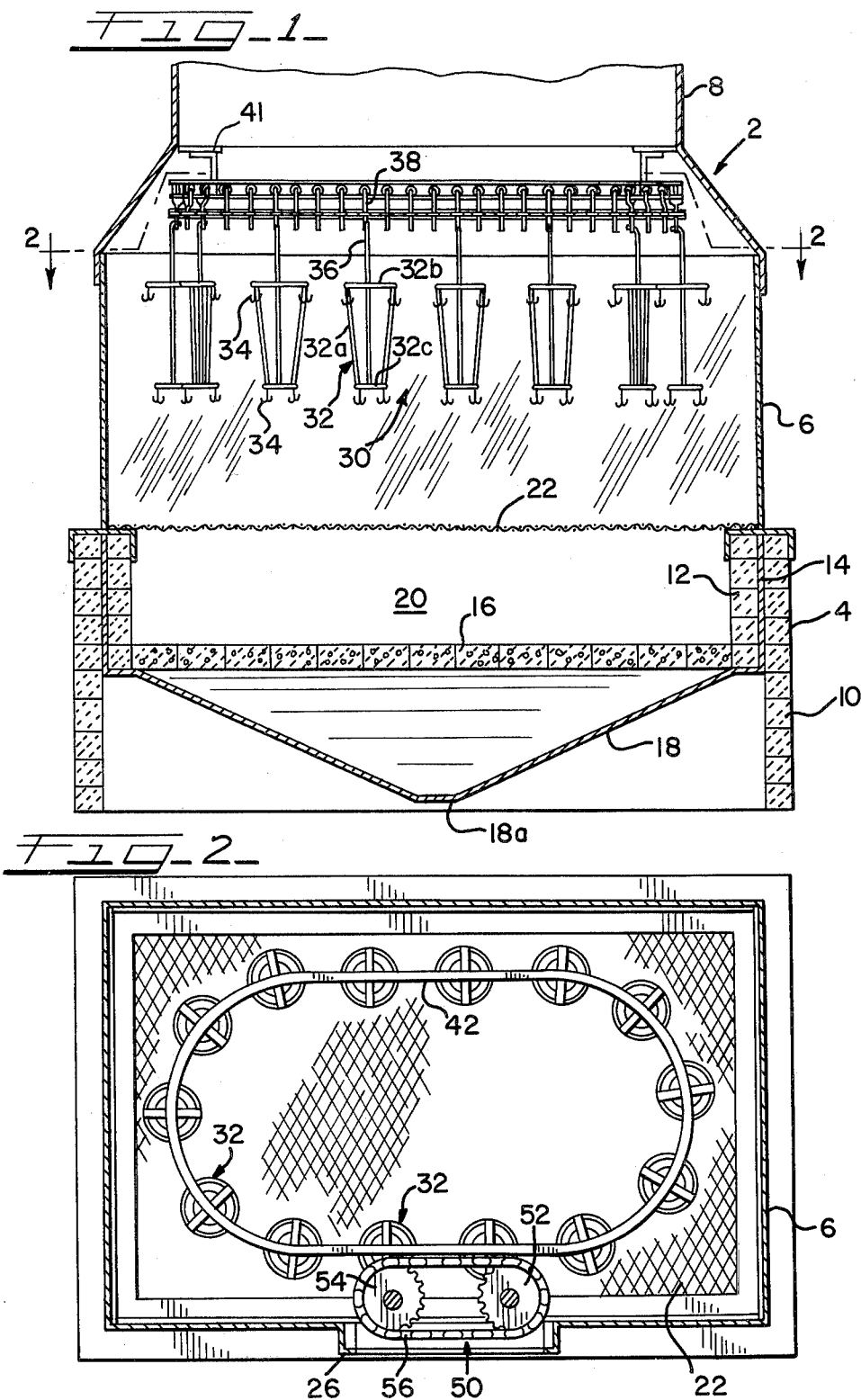

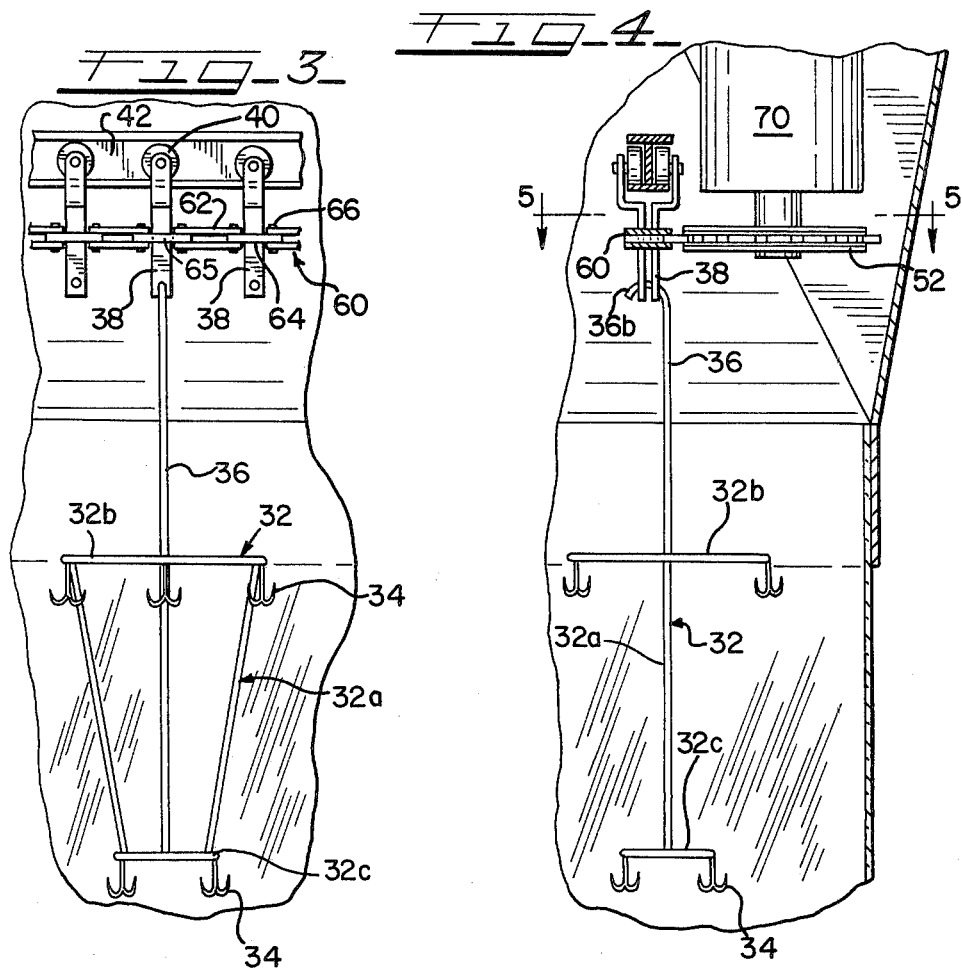
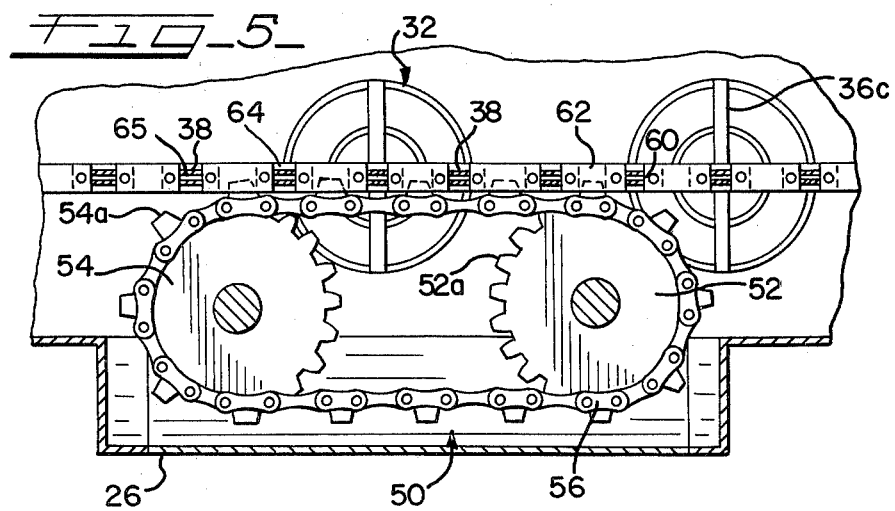

COOKING APPARATUS

BACKGROUND OF THE INVENTION

This invention relates in general to cooking devices and, in particular, to an apparatus which cooks meat or other food items without constant manual labor or attention.

More specifically, but without restriction to the particular use which is shown and described, this invention relates to an improved cooking apparatus capable of subjecting meat and other items to broiling, baking or smoking action without constant manual attention. The apparatus of the invention includes means to cause the food items being cooked to orbit around a heat source in an improved manner to accomplish not only rapid and effective cooking without manual turning, but enhance the flavor of the food because of its unique design. The invention of the application further provides means to effectively retain the heat within the cooking enclosure and collect grease from the cooking items in a safe and convenient manner.

It has long been popular to cook meat, such as ribs, steaks, chicken, and the like, over an open pit having a fire sustained by wood, charcoal and the like. In some instances, it is desirable to cover the meat, particularly ribs and chicken, with a sauce to enhance its flavor. In addition, particular woods, such as hickory and the like, have been utilized in the past to cook meats for producing a unique and distinctive flavor.

One current popular type of cooking in restaurants, carry out shops, and the like involves the so-called barbecuing of meat in the form of chicken, ribs or some other food. Commonly, barbecue ribs and chicken are cooked over an open fire in a pit by being supported by a rack. Such open fire cooking, particularly as it is used in the restaurants, kitchens or carry out shops, suffers from several disadvantages. One shortcoming of such cooking of meat lies in the fact that the ribs or chicken and the like must be constantly observed by an attendant and manually turned at different intervals to insure even cooking and prevent burning. The necessity for such manual attention has reduced the efficiency of the cooking operation for restaurants and carry out shops and further subjects the cook to uncomfortable work conditions, because of heat and smoke emanating from the fire and cooking meat. The smoke and heat from open pits or like equipment can interfere with the comfort within the restaurant or kitchen facilities and place an added workload on air conditioners and exhaust fans to waste the consumption of energy.

In addition to these deficiencies of the prior techniques of cooking meat in an open pit or similar area, no means has heretofore been provided in prior systems to collect the grease and juices which are present in meat cooking equipment. Thus, it is desirable to provide an improved cooking system in which all the aforementioned difficulties of the prior art and other problems are alleviated.

SUMMARY OF THE INVENTION

It is, therefore, an object of this invention to improve the cooking of feed over a heat source.

Another object of this invention is to constantly move food items being cooked over a heat source in a manner to obtain rapid cooking and/or enhance the meat.

A further object of this invention is to reduce the manual labor needed in cooking large volumes of meat and the like.

Still another object of this invention is to cook food items within an enclosed area for efficient cooking and flavor enhancement.

Still another object of this invention is to safely handle and dispose of grease and other substances produced during the cooking process.

Still another object of this invention is to effectively isolate the heat needed to cook meat and the like over a heat source.

Still another object of the invention is to effectively isolate the fumes and smoke emanating from a cooking system from the surroundings in which it is located.

These and other objects are attained in accordance with the present invention wherein there is provided an improved barbecue cooking apparatus having means to suspend meat or other food items above a heat source, such as produced by burning wood, charcoal or with gas burners and the like. The food items being cooked over the heat source are maintained in constant motion in an orbital or similar path, such that the food is subjected to even cooking with the attainment of enhanced flavoring and maintainence of juices within the meat. The invention of the application is capable of cooking large volumes of meat and the like with or without sauces, within a minimum of time as compared to the prior techniques and does not require constant manual manipulation of the meat to insure that all portions are evenly exposed to the flame during the cooking process. The invention of the application is economical to operate, since it effectively confines the smoke and heat to within the apparatus and thereby prevents such fumes and heat to be transferred to the surrounding kitchen or other areas in which the equipment is situated. The cooking apparatus of the invention is uniquely insulated to prevent heat transfer and is easy to clean by virtue of its novel collection of grease and the like.

DESCRIPTION OF THE DRAWINGS

Further objects of the invention together with additional features contributing thereto and advantages accruing therefrom will be apparent from the following description of a preferred embodiment of the invention which is shown in the accompanying drawings with like reference numerals indicating corresponding parts throughout, wherein:

FIG. 1 is a partial elevational end view, with parts in section, of the improved cooking apparatus of the invention;

FIG. 2 is a top sectional view taken along lines 2—2 of FIG. 1;

FIG. 3 is an enlarged partial schematic view of the meat hanging racks of the improved cooking apparatus of FIG. 1;

FIG. 4 is a partial end schematic view with parts in section, of the motor and rack drive of the invention; and FIG. 5 is an enlarged partial schematic view of the rack drive of the improved cooking apparatus of FIG. 1.

DESCRIPTION OF A PREFERRED EMBODIMENT

Referring now to FIG. 1, there is illustrated a preferred embodiment of the improved cooking apparatus of the invention, generally designated by reference numeral 2. The cooking apparatus 2 is a self contained unit capable of being situated within a kitchen or other interior room, such that meat in the form of ribs, chicken and the like, or other food items, may be cooked or barbecued on a high volume basis with enhanced flavor and in minimum cooking time. The cooking apparatus 2 includes, in general a housing formed from a base portion 4, an intermediate sidewall portion 6, and an upper cover assembly 8 formed of a metal material. Although the configuration of the apparatus 2 (FIG. 2) is shown being rectangular, it is within the scope of the invention to utilize other suitable shapes, if desired. Preferably, the intermediate portion of sidewall 6 has at least a portion thereof formed from a transparent material, such as glass or heat resistant plastic, to enable a cook or customer to observe the cooking process in progress. The upper cover assembly 8 may include exhaust outlets (not shown) coupled to a suitable exhaust fan (not shown) to draw smoke and other fumes created in the cooking process outward to the outside of the building and the like in which apparatus 2 is situated. If desired, suitable filtration means may be utilized in the exhaust system to insure pollution free operation.

The base portion 4 of the cooking apparatus 2 is formed with intersecting walls having an outer layer of bricks or stones 10 extending about the periphery of the apparatus 2. An inner heat resistant layer of bricks 12 is suitably affixed to the inner face of the outer brick layer 10 to create heat insulation. The layer 12 of heat resistance bricks may be supported adjacent the outer wall by any suitable means, such as a metal flange as shown. A metal sheet member 14 is situated between the fire resistant bricks 12 and the outer brick layer 10 to reduce the heat transfer through the two layers of bricks 10 and 12. The bottom floor 16, comprising a layer of heat resistant bricks or stone, is coupled by suitable means to the bottom of the fire resistance walls 12 and is secured thereto by any bracket assembly or other suitable attachment and reinforcing technique. The inner surfaces of bricks 12 and the top of the floor 16 form a chamber 20 covered by a porous screen 22 in which wood, charcoal and the like may be burned or alternatively, gas or other types of burner, may be disposed to create a heat source. The bricks utilized in the floor 16 are intentionally porous to permit grease, juices, and other liquid draining from the meat during cooking to pass through the floor 16 into a grease removal compartment located beneath the floor. A sloped continuous surface 18 is disposed beneath the floor 16 and is attached to the base section 4 by suitable means to enable grease to be collected at a predetermined location and easily removed. Access beneath the floor may be provided by a removable door or panel (not shown) in one of the walls 4. Thus, grease is not retained within the cooking chamber 20, but is directed downward for ready collection in the trap 18a formed on surface 18.

An upper portion of the cover assembly 8 is provided with a compartment 26, as best shown in FIG. 2, to receive the unique gear and drive chain assembly of the invention to be described later. The meat hanging assembly is generally designated by reference numeral 30 and includes a plurality of support brackets 32 having a number of near vertical rod members 32a made rigid by an upper ring 32b and a lower ring 32c to give each of the support brackets 32 an approximate truncated cone configuration in plan view. A plurality of hook-like elements 34 are attached to both rings 32b and 32c to hang one or more pieces of meat or other food items above the heat source. Each bracket 32 is capable of carrying a plurality of pieces of meat and providing an increase in the volume capability of the cooking apparatus. Each of the support brackets 32 is carried by an elongated central rod 36 which is affixed to cross members 36a (FIG. 5) welded or otherwise attached horizontally across rings 32b and 32c. The upper end of rod 36 of each bracket 32 is removably affixed by upper hook portion 36b (as best shown in FIG. 4) to a pair of interconnected bar members 38 attached together in a manner to be described and having aligned holes at the bottom thereof. The bar members 38 extend upward and are bent to form U-shaped upper portions on which a roller 40 is mounted for rotation on each portion.

An elongated track having a "I beam"-like cross section is suitably affixed by typical support 41 (FIG. 1) to the structure of the cover assembly 8 and extends around in a continuous path around the barbecue cooking assembly in a horizontal plane. It should be apparent, therefore, that the bar members 38 are movably carried on rollers 40 along the track 42 which is supported on the structure of the apparatus 2. Accordingly, movement of the bar members 38 causes the support brackets 32, and any meat or food item disposed on the hooks 34, to assume a path of movement over the heat source. As will be apparent, the brackets 32 are caused to move in a generally continuous motion above the heat, such that the items being cooked are constantly turned and are subjected to a highly efficient and uniform cooking process. It should also be clear that the brackets 32 are removably attached to the bar members 38 in a manner that any selected number of bar members 38 may be utilized to hang a plurality of meat items.

Movement of the meat or other food items about an orbital path above the heat source is created by a chain drive assembly 50 having a pair of rotatably mounted gears or pinions 52 and 54. Each of the pinions 52 and 54 respectively includes a plurality of gear teeth 52a and 54a which mesh with the links of a continuous drive chain assembly 56 (FIGS. 2 and 5). The height of the gear teeth 52a and 54a is selected to project beyond the opposite side of the continuous chain assembly 56, as best shown in FIG. 5, to engage a continuous elongated linkage 60 movably disposed by suitable supports (not shown) beneath the tracks 42 in substantially parallel relationship.

The continuous linkage 60 is formed by alternate pairs of spaced parallel links or bars 62 coupled together by a series of single connecting bars 64. The outer portions of gear teeth 52a and 52b extend into the unengaged space 62a between bars 62 as the linkage 60 is moved past the pinions. Each connecting bar 64 includes opposite end portions extending between adjacent spaced bars 62 and pivotally secured thereto by respective pin members 66. The connecting bar 64 may include a respective slot 65 or like means to receive respective pairs of bar members 38 therethrough to form a unitary structure and to cause movement thereof. Pinion 52 is connected by a drive shaft to a power drive such as an electric motor 70 as shown in FIG. 4.

In operation, support brackets 32 may selectively be attached to the holes of selected pairs of bar members 38 with meat or other food hanging from hooks 34. Alternatively, food items may be attached to the hooks 34 after the brackets 32 have been attached. Actuation of drive motor 70 causes rotation of both pinions 52 and 54 through drive chain 56. The outer peripheral portions of the gear teeth 52a and 54a are designed to engage the space between spaced bars 62 of the continuous linkage 60. Thus, the linkage 60 is caused to move and carry each of the pairs of bar members 38 in coupled motion therewith with the rollers 40 moving along track 42. It should be apparent that the hanging food items are placed into continuous motion above the heat source with the portions exposed thereto being constantly varied.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. An apparatus for cooking food items comprising:
   housing means for forming an enclosure for cooking food items;
   said housing means including a lower chamber in which a source of heat may be produced and an upper continuous horizontal track mounted within said enclosure;
   bracket means coupled to said housing means and suspended above said heat producing chamber to support food items to be cooked;
   said bracket means including a plurality of spaced bracket members disposed above said source of heat;
   said bracket members being mounted on said continuous horizontal track to movably suspend said bracket members downward therefrom for continuous motion in an orbital path above said heat producing chamber;
   said bracket members each supporting at a lower portion thereof a selectively removable hanger for suspending the food items above said heat producing chamber, each of said hangers having a plurality of retaining elements to support a plurality of items above the heat;
   drive means operatively coupled to said bracket means for causing said bracket members and its associated hanger to move relative to said track, said drive means including an endless member in operative contact with at least some of said bracket members and said drive means further including means to cause movement of said endless member; and
   said hangers each include a bottom portion having a plurality of hooks arranged in a plurality of horizontal planes and an upper portion having an upper curved end to attach to an aperture of the lower portion of said bracket member.

2. The apparatus according to claim 1 wherein said track means forms endless horizontal surface,
   said bracket means includes rollers coupled to said upper end portion of said bracket members and adapted to move on said horizontal surface.

3. The apparatus according to claim 1 wherein said endless member engages each of said bracket members.

4. The apparatus according to claim 3 wherein said endless member includes a plurality of interconnected link members and said means to cause movement of said endless member engages some of said link members on a periodic basis.

5. The apparatus according to claim 4 wherein said means to cause movement of said endless member includes at least one rotatable member adapted to engage said link members.

6. The apparatus according to claim 1 wherein said heat producing chamber is surrounded on its sides by heat resistant walls.

7. The apparatus according to claim 6 wherein said heat producing chamber includes a bottom wall, said bottom wall is permeable to passage of liquid substances produced during the cooking process.

8. The apparatus according to claim 7 wherein said housing means includes means to collect said liquid substances.

9. The apparatus according to claim 1 wherein said endless mamber is attached to said bracket members at a position between said upper and lower portions.

10. The apparatus according to claim 9 wherein said bracket members extend through respective vertically oriented slots in said endless member.

11. The apparatus according to claim 9 wherein said bracket means includes at least one roller rotatably mounted on said upper portion of said bracket member, said track means including an endless track member having an I-shaped cross section, said at least one roller of said bracket members riding on a horizontal surface of said track member.

* * * * *